Jan. 26, 1954

T. RAMOS ET AL
APPARATUS FOR TESTING CALKING
AND THE LIKE MATERIALS
Filed May 8, 1951

2,667,069

INVENTORS
THOMAS RAMOS
ALBERT W. CIZEK JR.
SIDNEY WEISS
BY
ATTORNEYS

Patented Jan. 26, 1954

2,667,069

UNITED STATES PATENT OFFICE 2,667,069

APPARATUS FOR TESTING CALKING AND THE LIKE MATERIALS

Thomas Ramos, New York, Albert W. Cizek, Jr., Valley Stream, and Sidney Weiss, New York, N. Y.

Application May 8, 1951, Serial No. 225,254

3 Claims. (Cl. 73—91)

(Granted under Title 35. U. S. Code (1952), sec. 266)

The invention described herein may be manufactured and used by or for the Government of the United States of America for governmental purposes without the payment of any royalties thereon or therefor.

This invention pertains to the art of testing materials, and more particularly to the art of testing the kind of materials that are used for calking seams in ship structures, and for testing other similar materials.

Invention resides in apparatus devised for testing materials of the type to which the invention pertains.

For practice of the invention, a specimen assembly is provided that comprises a plurality of blocks which are adhered to each other by means of the material to be tested. The blocks are positioned end to end, and adjacent end surfaces of the several blocks are adhered together by a predetermined thickness of the material to be tested. The resultant specimen assembly is repeatedly bent or flexed transversely of a line through the thickness of the material being tested.

Flexing the specimen assembly operates to knead or work the material between the blocks and causes the distance to be expanded between opposed surfaces of the several blocks that are adhered together by the material. The effective result is that the specimen assembly becomes lengthened, and elongation of the specimen assembly is employed as the standard for testing the material.

The specimen assembly is held at its one end, a fixed support being provided for the purpose. The other end of the specimen assembly is now repeatedly actuated transversely of its length, and the specimen assembly is thereby repeatedly flexed. A power driven fatigue testing machine embodying a power-stop control may be employed for repeatedly bending the specimen assembly.

The power control of the machine comprises an abutment member such as a push button which operates to stop the machine when it is engaged. An abutment head is secured to the end of the specimen assembly remote from its rigidly supported end, and is so disposed that it operates to actuate the abutment member of the machine control to stop the machine when the specimen assembly has become elongated to a predetermined length. A counter is embodied in the machine that records the number of reciprocations required to stop the machine.

Figure 1:
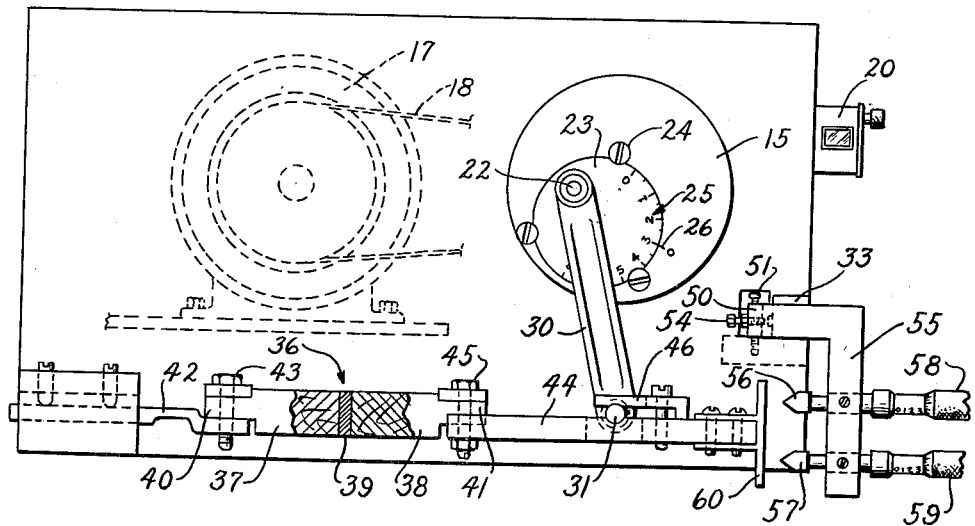
Figure 2:
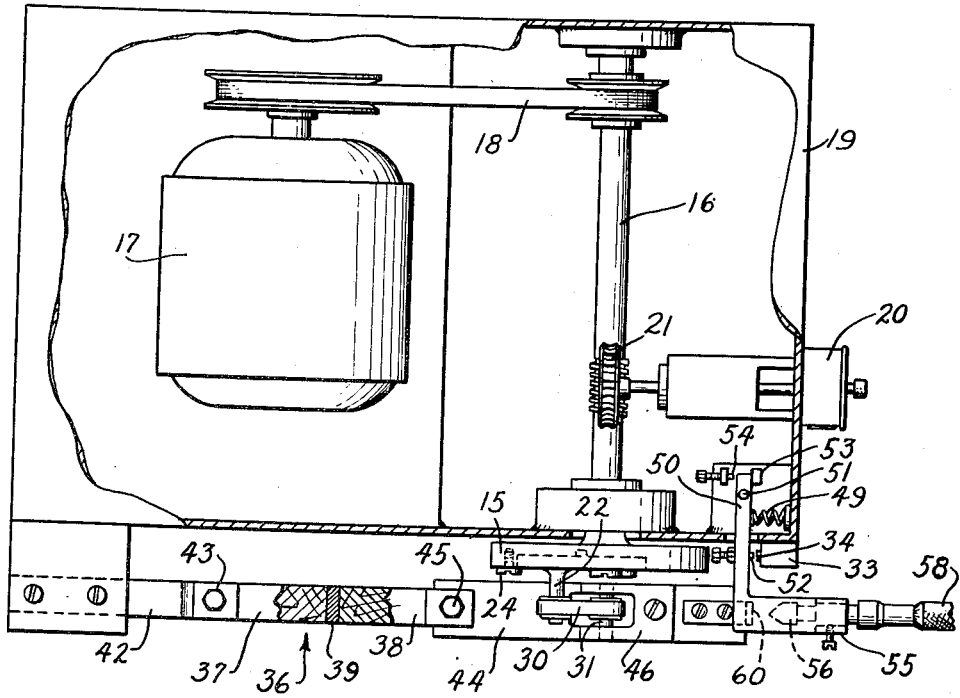

The principles of the invention, and one practical embodiment thereof, will be clear from the accompanying drawing to which attention is now directed. In the drawing Fig. 1 is a front elevation of a machine which is set up for practice of the invention, and Fig. 2 is a plan view of the machine of Fig. 1, with certain parts broken away.

The machine shown in the drawing is a prior-art fatigue testing machine, with certain modifications for practice of the present invention. The machine comprises the disc 15, which is secured to the shaft 16 to rotate therewith, the shaft being driven by the motor 17 through the belt 18. Housing 19 encloses the motor 17 and shaft 16 as shown. The counter 20 is mounted on the housing 19 exteriorly thereof where it may be seen, and is driven from shaft 16 through gears 21.

The disc 15 constitutes a crank. Its crank pin 22 is carried by the smaller disc 23, which sets into the face of crank disc 15 eccentrically with reference thereto. The crank pin 22 is set off-center of its disc 23, which is mounted to rotate in disc 15, and the crank pin 22 thereby is positionable selectively different distances from the center of crank disc 15. The disc 23 is secured in adjusted position with reference to disc 15 by means of set screws 24, and the crank arm length is determined thereby. The peripheral scale 25 of disc 23 traverses the indicator line 26 of disc 15 and indicates the magnitude of eccentricity of the crank pin 22 with reference to the crank disc 15. The scale 25 is calibrated to indicate the length of throw of the crank 15, 22.

The connecting rod 30 is carried by the crank pin 22 and the wrist pin 31 at the opposite end of the connecting rod is adapted to be attached to whatever device is intended to be reciprocated by the machine.

The microswitch 33 is electrically connected to the motor 17, and stops the machine when its push button 34 is actuated.

A specimen assembly 36 is provided for testing the calking material or the like under practice of the present invention.

The specimen assembly 36 comprises two blocks 37 and 38 which are adhered together by means of the material 39, this being the calking or the like material to be tested. The blocks 37 and 38 are placed end to end as shown, adjacent ends of the blocks being adhered to each other by means of the material. The thickness of the material 39 is predetermined in conformance with established standards for the kind of tests of the invention.

In the disclosed embodiment, the material of the blocks 37 and 38 is wood, and preferably wood of the type that is commonly available and used for planks and beams of ships. Thus, tests of the calking material 39 are made under conditions that simulate the actual conditions of use of the material in ship structures. The blocks 37 and 38 are cut cross-grained, and the end surfaces of the blocks that are adhered to each other are cut with the grain, the grains of the several blocks being parallel in the specimen assembly 36.

The end of the block 37 remote from the calking material 39 is constructed to comprise an attachment 40, and the end of block 38 remote from the calking material 39 is also constructed to comprise an attachment 41, the attachments 40 and 41 preferably being alike to simplify the structure.

The attachment 40 of specimen assembly 36 is rigidly secured to a fixed support 42 by means of the cap screw 43, the support 42 of the disclosure being a component of the fatigue testing machine, and the attachment 40 being constructed companion thereto. The specimen assembly 36 is secured to the actuating arm 44 by means of its attachment 41, the actuating arm 44 being constructed companion to the attachment 41 to be secured thereto by means of the bolt 45.

The actuating arm 44 extends from the end 41 of specimen assembly 36 to and beyond the wrist pin 31 of the connecting rod 30, and comprises the clamping plate 46 which embodies a bearing for the wrist pin 31. The bearing of clamping plate 46 is positioned lengthwise thereof to be below the axis of rotation of the crank disc 15, approximately in vertical alignment therewith. By the motor 17 driving to rotate the crank disc 15, the actuating arm 44 is reciprocated up and down, and the specimen assembly 36 is thereby repeatedly flexed. Because of the properties of the blocks 37 and 38 and the relative properties of the calking material 39, deformation that results from the bending stress is virtually localized in the calking material 39.

Switch-actuating lever 50 is carried by housing 19 positioned to swing on pivot 51 in directions towards and away from the microswitch 33, and comprises the abutment pin 52 positioned to engage the push button 34 thereof. Spring 49 is stressed to actuate the lever 50 in the direction away from push button 34 and against the fixed stop 53. The abutment pin 52 is adjustable to set the distance that lever 50 must move for the abutment pin to engage the push button 34 and operate switch 33. Movement of lever 50 in the direction towards the microswitch 33 is limited by the stop 54, which is adjustable to limit movement of lever 50 in the direction towards switch 33. This prevents excessive pressure being applied to push button 34, which might damage the sensitive microswitch 33.

The arm 55 of lever 50 carries the abutment fingers 56 and 57 positioned respectively above and below the median line of specimen assembly 36 when it is in relaxed condition and supported by the fixed support 42, the distance of the several abutment fingers 56 and 57 from the median line of specimen assembly 36 being approximately the same. Each abutment finger 56 and 57 is rigidly secured at the end of the movable spindle of a micrometer 58 or 59 respectively, and the micrometers are secured to the arm 55 to constitute mounts for the respective abutment fingers 56 and 57. The micrometers 58 and 59 locate the abutment fingers 56 and 57 and comprise a micrometer adustment of the fingers towards and away from the specimen assembly 36.

The abutment plate 60 is secured to the abutment arm 44 at the end thereof remote from its attachment at 41 to the specimen assembly 36, the abutment plate 60 being positioned opposed to the abutment fingers 56 and 57 of the switch-actuating lever 50, and extending transversely away from the median line of specimen assembly 36 far enough in both directions to be opposite both abutment fingers 56 and 57 throughout the cycle of oscillation of actuating arm 44. Oscillation of arm 44 by rotation of crank disc 15 actuates the abutment plate 60 towards the abutment fingers 56 and 57 alternately. During downward swing of arm 44, the abutment plate 60 moves towards the upper abutment-finger 56, and abutment plate 60 moves towards the lower abutment finger 57 during the upward swing of arm 44.

To test a sample of calking material or the like, a specimen assembly is provided comprising a set of blocks 37 and 38 positioned end to end and adhered to each other by the predetermined standard thickness of the material 39. The specimen assembly is then mounted in the machine by its end 40 being secured to the support 42. The actuating arm 44 is secured to the opposite end 41 of the specimen assembly 36, and the wrist pin 31 is positioned in bearing engagement with clamping plate 46.

The disc 23 is rotated in the crank disc 15 to set the crank of disc 15 for the desired length of stroke, set screws 24 being then tightened to secure the setting.

The micrometers 58 and 59 are adjusted to set each of the abutment fingers 56 and 57 a predetermined distance away from the face of abutment plate 60, the upper finger 56 being set when the wrist pin 31 is at the lower end of its stroke, and the lower finger 57 being set at the upper end of the stroke of wrist pin 31. Both abutment fingers 56 and 57 preferably are set the same distance away from the abutment face of plate 60, a distance of about three thousandths of an inch (.003") being usually satisfactory.

The motor 17 is now started, and it is operated continuously until the microswitch 33 is operated to stop it. The material 39 is worked and kneaded as a result of the specimen assembly 36 being flexed by the repeated oscillations of the actuating arm 44. This causes the distance between opposed faces of the blocks 37 and 38 to spread and the process of spreading continues until the abutment plate 60 contacts and actuates one or the other of the abutment fingers 56 and 57. The microswitch 33 is very sensitive, and is generally operated to stop the motor 17 by the first engagement of one of the abutment fingers 56 and 57 by the plate 60. The counter 20 indicates the number of oscillations of actuating arm 44 that were required to stop the motor 17.

There is a tendency of the material 39 to pull away from one or the other of the blocks 37 and 38, and this is sometimes caused by the persistent working of the material while the machine is in operation. The opposed faces of the blocks 37 and 38 are thereby spread apart, causing engagement of push button 34 by the abutment finger 54 and operation of the microswitch 33 to stop the machine. From inspection of a specimen assembly 36 after a test is completed it may be observed if the material 39 has pulled away from one or the other of the block 37 or 38 or from both, and this is an indication of the adhesive qualities of the material 39.

The specific structure disclosed herein is only one of many practical applications of the invention, therefore the invention is not to be limited to the specific embodiment of the disclosure. The scope of the invention is determined by the accompanying claims.

We claim:

1. A flexure testing machine adapted to test a specimen formed of a set of blocks positioned end to end and adhered to each other by their adjacent end surfaces being adhered together and with a predetermined thickness of the material to be tested constituting the adhesive between the blocks, said testing machine comprising a fixed support for holding one end of the specimen assembly, a reciprocating mechanism, an attachment for securing the other end of the specimen assembly to the reciprocating mechanism to flex the specimen assembly in a direction transversely of its length, a counter to indicate the number of reciprocations, a motor for driving the reciprocating mechanism, a control device for the motor, actuating mechanism for the control device operable by elongation of the specimen assembly under flexure stress, the control-actuating mechanism comprising an abutment head secured to the end of the specimen assembly remote from the fixed support, a companion abutment member carried by the control actuating mechanism, and a micrometer adjustment between the abutment head of the specimen assembly and the abutment member of the control-actuating mechanism.

2. In mechanism as described in claim 1, the abutment member of the control-actuating mechanism comprising a set of abutment fingers respectively positioned on opposite sides of the median line of the specimen assembly in relaxed condition and projecting lengthwise of the specimen assembly towards the reciprocable end thereof, the abutment head comprising a plate extending to positions opposite the several abutment fingers in both directions transversely away from the median line of the specimen assembly in relaxed condition.

3. In mechanism as defined in claim 2, the micrometer adjustment comprising a micrometer for each abutment finger operable to adjust its position towards and away from the opposite abutment plate.

THOMAS RAMOS.
ALBERT W. CIZEK, Jr.
SIDNEY WEISS.

References Cited in the file of this patent

UNITED STATES PATENTS

| Number | Name | Date |
|---|---|---|
| 1,599,254 | Smith | Sept. 7, 1926 |
| 1,843,074 | Abbott | Jan. 26, 1932 |
| 2,007,286 | Schopper | July 9, 1935 |
| 2,591,444 | Lazan | Apr. 1, 1952 |
| 2,601,782 | Foreman et al. | July 1, 1952 |